US008024152B2

(12) United States Patent
Zhang et al.

(10) Patent No.: US 8,024,152 B2
(45) Date of Patent: Sep. 20, 2011

(54) TENSOR LINEAR LAPLACIAN DISCRIMINATION FOR FEATURE EXTRACTION

(75) Inventors: Wei Zhang, Beijing (CN); Zhouchen Lin, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 12/235,927

(22) Filed: Sep. 23, 2008

(65) Prior Publication Data

US 2010/0076723 A1    Mar. 25, 2010

(51) Int. Cl.
*G06F 17/16* (2006.01)
*G06F 17/11* (2006.01)

(52) U.S. Cl. ........ 702/179; 702/194; 702/196; 708/270; 708/520

(58) Field of Classification Search .................. 702/179, 702/194, 196
See application file for complete search history.

(56) References Cited

U.S. PATENT DOCUMENTS

| | | | |
|---|---|---|---|
| 5,255,342 A | 10/1993 | Nitta | |
| 5,754,681 A | 5/1998 | Watanabe et al. | |
| 6,441,821 B1 | 8/2002 | Nagasawa | |
| 2002/0018596 A1* | 2/2002 | Nagao | 382/205 |
| 2005/0201595 A1* | 9/2005 | Kamei | 382/118 |
| 2007/0112699 A1 | 5/2007 | Zhao et al. | |
| 2008/0025609 A1 | 1/2008 | Yashiro et al. | |
| 2008/0130962 A1* | 6/2008 | Lee et al. | 382/118 |
| 2009/0297046 A1* | 12/2009 | Zhao et al. | 382/224 |
| 2010/0067800 A1* | 3/2010 | Lin et al. | 382/190 |

OTHER PUBLICATIONS

Dai, et al., "Tensor Embedding Methods", In AAAI, 2006, 6 pages.
Wang, et al., "Feature Extraction by Maximizing the Average Neighborhood Margin", IEEE Conference on Computer Vision and Pattern Recognition, 2007. CVPR '07, Publication Date: Jun. 17-22, 2007, 8 pages.
Feddern, et al., "Level-Set Methods for Tensor-Valued Images", Proc. Second IEEE Workshop on Variational, Geometric and Level Set Methods in Computer Vision, 2003, 8 pages.
Ullrich Kothe, "Edge and Junction Detection with an Improved Structure Tensor", Proc. of 25th DAGM Symposium, Magdeburg 2003, Lecture Notes in Computer Science 2781, Heidelberg: Springer, 2003, pp. 25-32.
Arivazhagan, et al., "Texture classification using Gabor wavelets based rotation invariant features", Pattern Recognition Letters, 2006, 27 (16), pp. 1976-1982.
Belhumeur, et al., "*Eigenfaces* vs. *Fisherfaces*: Recognition Using Class Specific Linear Projection", IEEE Transactions on Pattern Analysis and Machine Intelligence, vol. 19, No. 7, Jul. 1997, pp. 711-720.
Belkin, et al., "Laplacian Eigenmaps for Dimensionality Reduction and Data Representation", Neural Computation, vol. 15, 2003, pp. 1373-1396.
Jia Li, "Regularized Discriminant Analysis and Reduced-Rank LDA", Elements of Statistical Learning, Hastie, Tibshirani & Firedman, 2001, 24 pages.
Hastie, et al., "Penalized Discriminant Analysis", Annals of Statistics, 1995, vol. 23, 31 pages.

(Continued)

*Primary Examiner* — Hal Wachsman
(74) *Attorney, Agent, or Firm* — Alleman Hall McCoy Russell & Tuttle LLP (57) ABSTRACT

Tensor linear Laplacian discrimination for feature extraction is disclosed. One embodiment comprises generating a contextual distance based sample weight and class weight, calculating a within-class scatter using the at least one sample weight and a between-class scatter for multiple classes of data samples in a sample set using the class weight, performing a mode-k matrix unfolding on scatters and generating at least one orthogonal projection matrix.

20 Claims, 4 Drawing Sheets

OTHER PUBLICATIONS

He, et al., "Image Clustering with Tensor Representation", MM'05, Nov. 6-11, 2005, Singapore, pp. 132-140.

He, et al., "Tensor Subspace Analysis", In Advances in Neural Information Processing Systems 18 (NIPS}, 2005, 8 pages.

He, et al., "Locality Preserving Projections", In Advances in Neural Information Processing Systems 16, 2003, 8 pages.

Howland, et al., "Generalizing Discriminant Analysis Using the Generalized Singular Value Decomposition", Apr. 7, 2003, IEEE Transactions on Pattern Analysis and Machine Intelligence, Aug. 2004, vol. 26, Issue: 8, 23 pages.

Lathauwer, et al., "A Multilinear Singular Value Decomposition", SIAM Journal on Matrix Analysis and Applications, vol. 21, No. 4, 2000, pp. 1253-1278.

Ma, et al., "Segmentation of Multivariate Mixed Data via Lossy Data Coding and Compression", IEEE Transactions on Pattern Analysis and Machine Intelligence, vol. 29, No. 9, Sep. 2007, pp. 1546-1562.

Manjunath, et al., "Texture Features for Browsing and Retrieval of Image Data", IEEE Transactions on Pattern Analysis and Machine Intelligence, vol. 18, No. 8, Aug. 1996, pp. 837-842.

Mullar, et al., "An Introduction to Kernel-Based Learning Algorithms", IEEE Transactions on Neural Networks, vol. 12, No. 2, Mar. 2001, pp. 181-202.

Ojala, et al., "Gray Scale and Rotation Invariant Texture Classification with Local Binary Patterns", IEEE Transactions on Pattern Analysis and Machine Intelligence, vol. 24, No. 7, Aug. 1996, pp. 971-987.

Phillips, et al., "Overview of the Face Recognition Grand Challenge", IEEE Computer Society Conference on Computer Vision and Pattern Recognition, 2005 (CVPR 2005), Publication Date: Jun. 20-25, 2005, vol. 1, pp. 947-954.

Tenenbaum, et al., "A Global Geometric Framework for Nonlinear Dimensionality Reduction", Apr. 4, 2007, 18 pages.

Wang, et al., "*Trace Ratio* vs. *Ratio Trace for Dimensionality Reduction*", IEEE Conference on Computer Vision and Pattern Recognition, 2007. CVPR '07, Publication Date: Jun. 17-22, 2007, 8 pages.

Wang, et al., "Dual-Space Linear Discriminant Analysis for Face Recognition", Proceedings of the 2004 IEEE Computer Society Conference on Computer Vision and Pattern Recognition (CVPR'04), 6 pages.

Wang, et al., "A Unified Framework for Subspace Face Recognition", IEEE Transactions on Pattern Analysis and Machine Intelligence, vol. 26, No. 9, Sep. 2004, pp. 1222-1228.

Wang, et al., "Random Sampling for Subspace Face Recognition", International Journal of Computer Vision 70(1), 2006, pp. 91-104.

Xu, et al., "Concurrent Subspaces Analysis", IEEE Computer Society Conference on Computer Vision and Pattern Recognition, 2005. CVPR 2005, Publication Date: Jun. 20-25, 2005, vol. 2, pp. 203-208.

Yan, et al., "Discriminant Analysis with Tensor Representation", IEEE Computer Society Conference on Computer Vision and Pattern Recognition, 2005, CVPR 2005, vol. 1, Issue , Jun. 20-25, 2005, pp. 526-532.

Yang, et al., "KPCA Plus LDA: A Complete Kernel Fisher Discriminant Framework for Feature Extraction and Recognition", IEEE Transactions on Pattern Analysis and Machine Intelligence, vol. 27, No. 2, Feb. 2005, pp. 230-244.

Ye, et al., "Two-Dimensional Linear Discriminant Analysis", Neural Information Processing Systems, NIPS 2004, Vancouver, British Columbia, Canada, Dec. 13-18, 2004, 8 pages.

Zhao, et al., "Contextual Distance for Data Perception", IEEE 11th International Conference on Computer Vision, 2007. ICCV 2007. Publication Date: Oct. 14-21, 2007, 8 pages.

Zhao, et al., "Linear Laplacian Discrimination for Feature Extraction", IEEE Conference on Computer Vision and Pattern Recognition, 2007. CVPR'07, Jun. 17-22, 2007, 7 pages.

* cited by examiner

TENSOR LINEAR LAPLACIAN DISCRIMINATION FOR FEATURE EXTRACTION

BACKGROUND

Discriminant feature extraction is an important topic in pattern recognition and classification. Current approaches used for linear discriminant feature extraction include Principal Component Analysis (PCA) and Linear Discriminant Analysis (LDA). Applications for PCA and LDA include pattern recognition and computer vision. These methods use a vector-based representation and compute scatters in a Euclidean metric, i.e., an assumption is made that the sample space is Euclidean, where an example metric is a function that computes a distance or similarities between two points in a sample space.

Despite the utility of these subspace learning algorithms, the reliance on a Euclidean assumption of a data space when computing a distance between samples has drawbacks, including the potential of a singularity in a within-class scatter matrix, limited available projection directions, and a high computational cost. Additionally, these subspace learning algorithms are vector-based and arrange input data in a vector form regardless of an inherent correlation among different dimensions in the data.

In one nonlinear approach, Linear Laplacian Discrimination (LLD), weights are introduced to scatter matrices to overcome the Euclidean assumption, however, the weights are defined as a function of distance and therefore still use an a priori assumption on a metric of the sample space.

SUMMARY

Accordingly, various embodiments for tensor linear Laplacian discrimination (TLLD) for feature extraction are described below in the Detailed Description. For example, one embodiment comprises generating a contextual distance based sample weight and class weight, calculating a within-class scatter using the at least one sample weight and a between-class scatter for multiple classes of data samples in a sample set using the class weight, performing a mode-k matrix unfolding on scatters and generating at least one orthogonal projection matrix.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
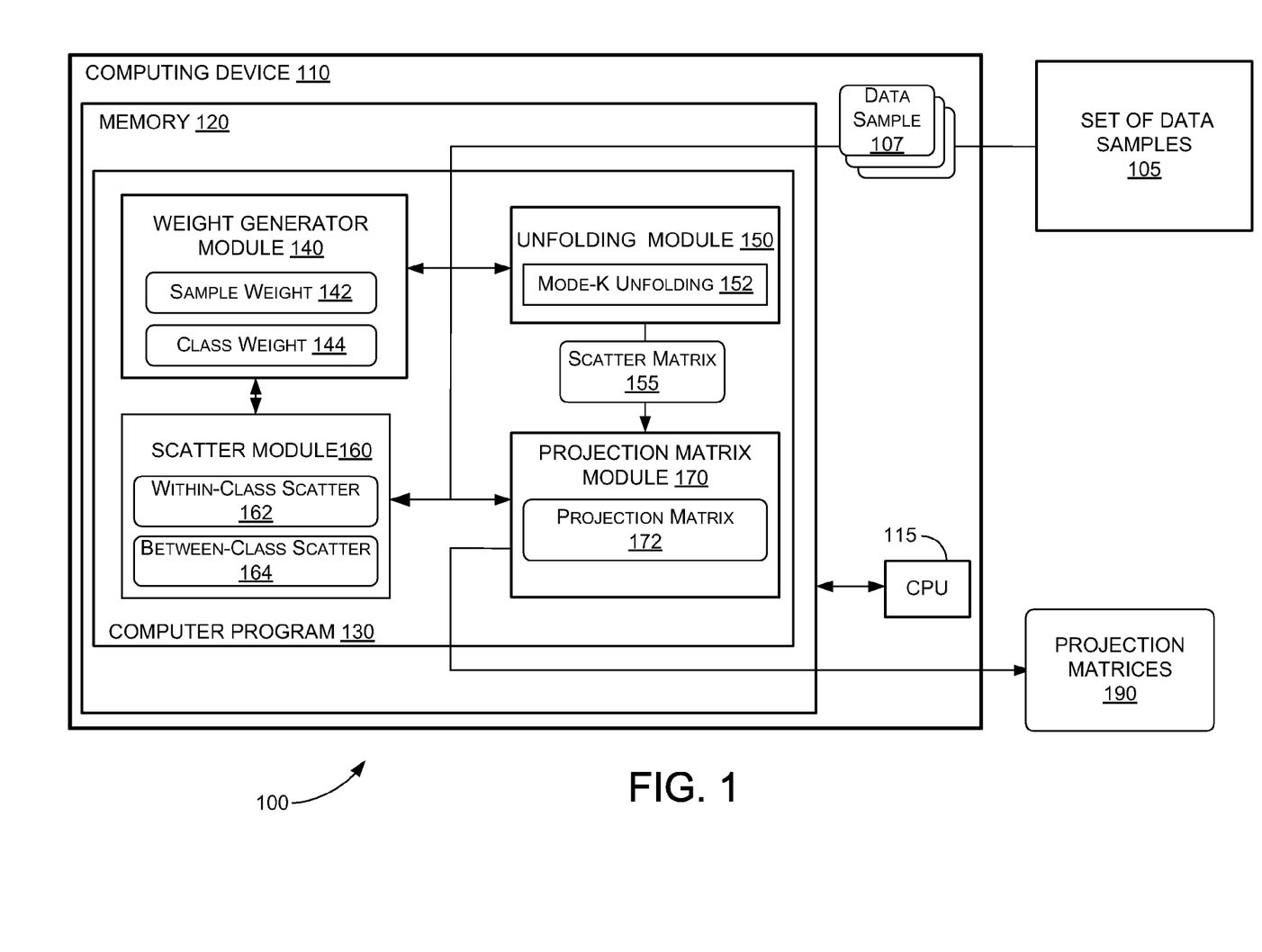
FIG. 1 shows an example of an embodiment of a tensor based feature extraction system.

FIG. 1 shows an example system 100 for extracting features from tensor based data. A tensor-based representation provides a discriminant feature extraction approach that may function independent of a metric used in a sample space. A tensor-based approach may operate without unfolding data or features into vectors, for example, one example tensor-based approach may use mode-k unfolding to unfold the tensor-based data into matrices. Additionally, a tensor based approach may operate on high-dimensional data such as tensor based data, and on low-dimensional data, for example if features in the data is high-dimensional, such as in face recognition applications, remote sensing applications, feature extraction of astronomy data, etc. Additionally, tensor-based algorithms can overcome several drawbacks of vector-based algorithms, like singularity of within-class scatter matrices, limited available projection directions and high computational costs.

In example system 100, computing device 110 includes an input, a memory 120, and a processor 115 in communication with the input and memory 120 and is configured to generate projection matrices 190. Computing device 110 further includes a computer program 130, and a weight generator module 140 to receive at least one data sample 107 from a set of data samples 105, and generate a sample weight 142 based on a contextual distance for each of the plurality of data samples. Additionally, weight generator module 140 may generate a class weight 144 based on a contextual distance for a first class of data samples, as will be described in the following description in more detail.

Computing device 110 may also include a scatter module 160 in communication with the weight generator module 140, the scatter module 160 being configured to receive the at least one sample weight 142 and a class weight 144, and then calculate a within-class scatter 162 using the at least one sample weight 142, and to calculate a between-class scatter 164 for multiple classes of data samples using the class weight 144.

Computing device 110 may also have an unfolding module 150 coupled with the weight generator module 140 and the scatter module 160 and generate one or more scatter matrices 155. The unfolding module 150 is configured to perform a mode-k matrix unfolding 152 on the within-class scatter 162 to generate a mode-k within-class scatter matrix. The unfolding module 150 is also configured to perform a mode-k matrix unfolding on the between-class scatter 164 to generate a mode-k between-class scatter matrix.

A projection matrix module 170 may also be configured with the weight generator module 140, the unfolding module 150, and the scatter module 160, in computing device 110. The projection matrix module 170 may be used to generate at least one orthogonal projection matrix 172 using the mode-k within-class scatter matrix and the mode-k between-class scatter matrix, as described in the following description.

Some embodiments may use a Tensor Linear Laplacian Discrimination (TLLD) method for non-linear feature extraction from tensor data. TLLD is a non-linear feature extraction technique utilizing the tensor nature of data, is relatively independent on any metric assumptions of a subject sample space, and improves parameter tuning resolution. In following paragraphs, definitions of some tensor operations are provided and an embodiment formulation of TLLD is then described.

Figure 3:
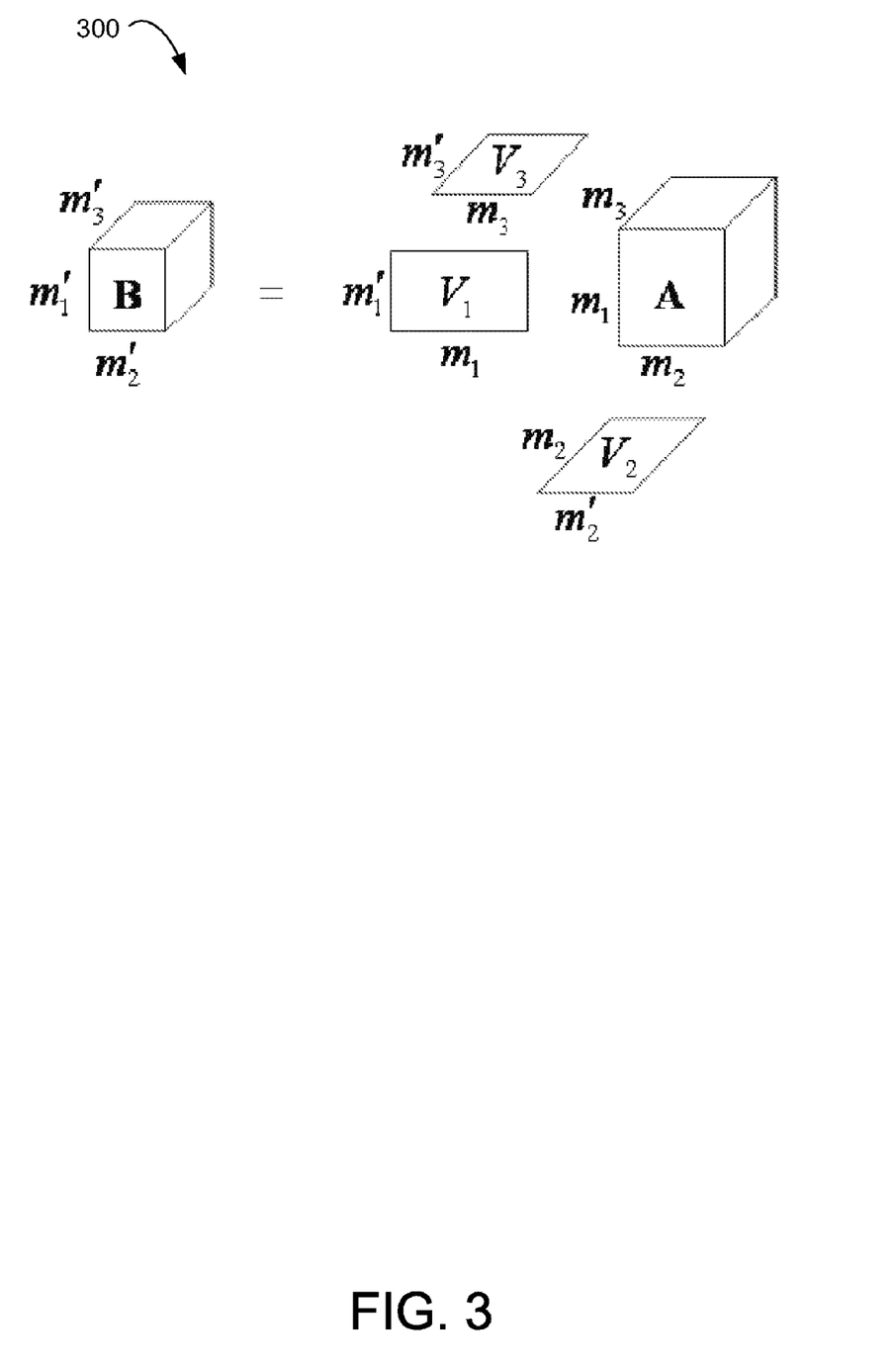
FIG. 3 shows a visualization of a multiplication between a tensor and a set of matrices.

Tensors have some features that may be applied favorably to feature extraction. FIG. 3 illustrates a visualization 300 of the equation $B = A \times_1 V_1 \times_2 V_2 \times_3 V_3$ for order-3 tensors $A \in R^{m_1 \times m_2 \times m_3}$ and $B \in R^{m'_1 \times m'_2 \times m'_3}$. A mode-k matrix unfolding of A is denoted by $A_{(k)} \in R^{m_k \times (m_{k+1} \cdots m_n m_1 m_2 \cdots m_{k-1})}$, where the element $A_{i_1 \cdots i_n}$ of A appears at an $i_k$-th row and an $u_k$-th column of $A_{(k)}$, in which:

$$u_k = (i_{k+1} - 1)m_{k+2}m_{k+3} \ldots m_n m_1 m_2 \ldots m_{k-1} +$$
$$(i_{k+2} - 1)m_{k+3}m_{k+4} \ldots m_n m_1 m_2 \ldots m_{k-1} + (i_n - 1)m_1 m_2 \ldots m_{k-1} +$$
$$(i_1 - 1)m_2 m_3 \ldots m_{k-1} + (i_2 - 1)m_3 m_4 \ldots m_{k-1} + i_{k-1} \quad (5)$$

Figure 4:
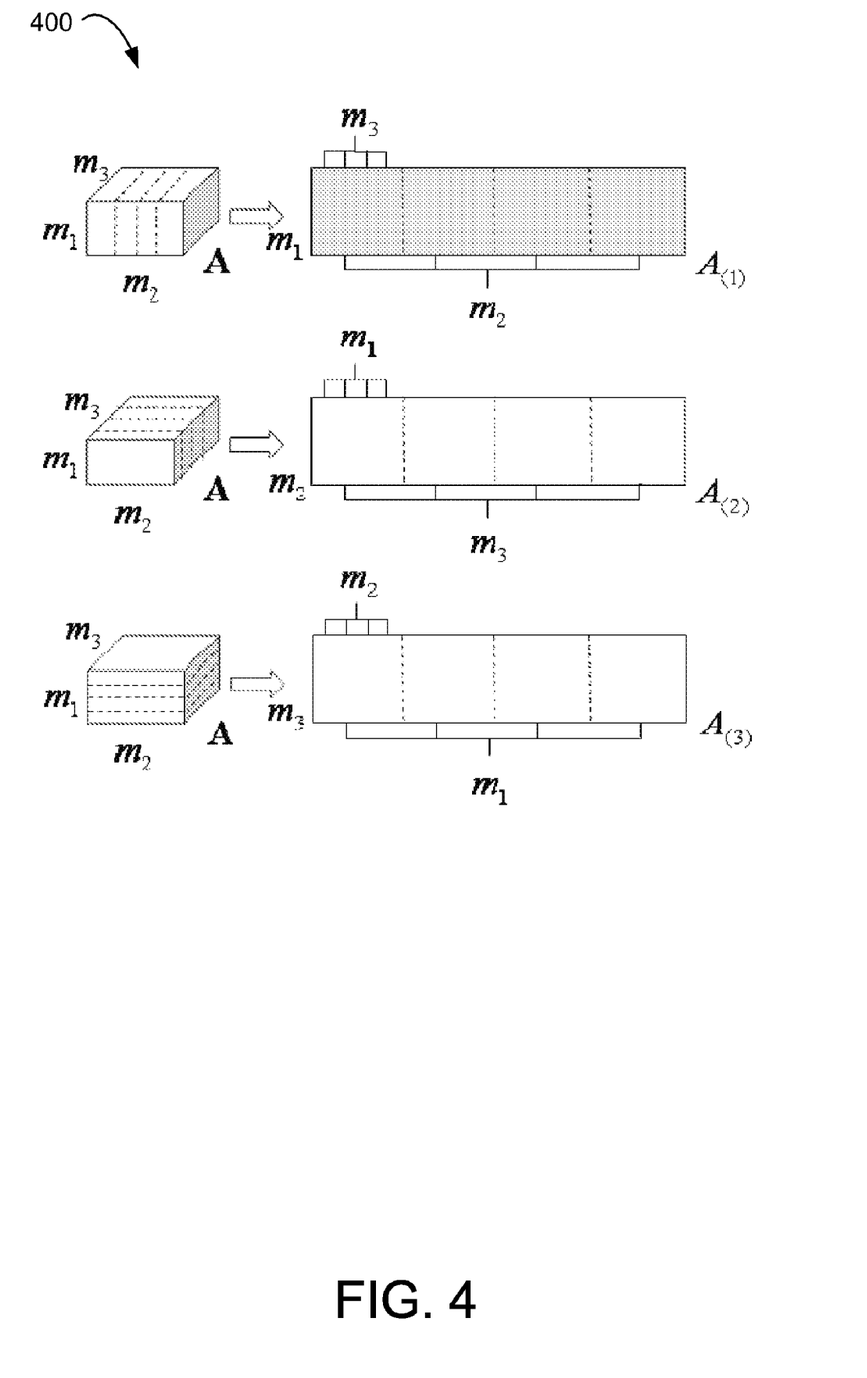
FIG. 4 shows an illustration of an unfolding of a tensor into matrices.

An illustration of an order-3 tensor's matrix unfolding 400 is shown in FIG. 4. And the k-mode product in tensor notation $B = A \times_k V$ can be expressed in terms of matrix unfolding: $B_{(k)} = V A_{(k)}$.

A TLLD discriminative feature extraction approach operates without unfolding tensors into vectors, and reduces within-class variance and increases between-class variance of low dimensional features after projections. In one example, let the samples in an order-n tensor representation be $X_i$, $i=1,2,\ldots,N$, where N is the number of samples. If $s_i$ is assigned as the class label of $X_i$, $N_s$ is a number of samples in an $s^{th}$ class, and the total number of classes is c, group of orthogonal projection matrices $U_k \in R^{m_k \times m'_k}(m'_k < m_k)$, $k=1, 2, \ldots, n$, may be determined wherein projected low dimensional tensors $$Y_i = X_i \times_1 U_1^T \times_2 U_2^T \ldots \times_n U_n^T, i=1,2,\ldots,N \quad (1)$$

have minimal with-class variance and maximal between-class variance.

Therefore, a within-class scatter may be calculated according to following formula:

$$\alpha = \sum_{s=1}^{c} \sum_{X_i \in Class\ s} w_i \|Y_i - \overline{Y}^s\|^2 \quad (2)$$

where $$\overline{Y}^s = \frac{1}{N_s} \sum_{X_i \in Class\ s} Y_i$$

denotes a centroid of the $s^{th}$ projected class, and $w_i$ is the weight for the $i^{th}$ sample. Similarly, a between-class scatter may be defined as:

$$\beta = \sum_{s=1}^{c} w^s N_s \|\overline{Y}^s - \overline{Y}\|^2, \quad (3)$$

where $w^s$ is the weight for the $s^{th}$ class. Some example approaches to calculate $w_i$ and $w^s$ will be presented below. Next, orthogonal projection matrices $U_k$, such that $\alpha$ is minimized and $\beta$ is maximized are calculated. One approach may use Fisher's criterion, where $$\arg\max_{U_1, U_2, \ldots, U_n} \frac{\beta}{\alpha}. \quad (4)$$

However, it is non-trivial to solve equation (4) for $U_i$ ($i=1, 2, \ldots, n$) at the same time. Some embodiments may use iterative methods to solve equation (4), for example $\alpha$ and $\beta$ may be reformulated using mode-k unfolding, according to the following formula:

$$\alpha = \sum_{i=1}^{N} w_i \|Y_i - \overline{Y}^{s_i}\|^2 \quad (5)$$

$$= \sum_{i=1}^{N} w_i tr\left[(Y_i - \overline{Y}^{s_i})_{(k)}(Y_i - \overline{Y}^{s_i})_{(k)}^T\right]$$

$$= \sum_{i=1}^{N} w_i tr\left[U_k^T (Z_i - \overline{Z}^{s_i})_{(k)}(Z_i - \overline{Z}^{s_i})_{(k)}^T U_k\right]$$

$$= tr\left\{U_k^T \left[\sum_{i=1}^{N} w_i (Z_i - \overline{Z}^{s_i})_{(k)}(Z_i - \overline{Z}^{s_i})_{(k)}^T\right] U_k\right\}$$

where $Z_i = X_i \times_1 U_1^T \times_2 U_2^T \ldots \times_{k-1} U_{k-1}^T \times_{k+1} U_{k+1}^T \ldots \times_n U_n^T$, and $(Z_i - \overline{Z}^{s_i})_{(k)}$ may be a mode-k matrix unfolding of $Z_i - \overline{Z}^{s_i}$, in which $\overline{Z}^{s_i}$ is a centroid of a set $\{Z_j | s_j = s\}$.

Furthermore, $\beta$ may be mode-k unfolded as follows:

$$\beta = \sum_{s=1}^{c} w^s N_s \|\overline{Y}^s - \overline{Y}\|^2 \quad (6)$$

$$= \sum_{s=1}^{c} w^s N_s tr\left[(\overline{Y}^s - \overline{Y})_{(k)}(\overline{Y}^s - \overline{Y})_{(k)}^T\right]$$

$$= \sum_{s=1}^{c} w^s N_s tr\left[U_k^T (\overline{Z}^s - \overline{Z})_{(k)}(\overline{Z}^s - \overline{Z})_{(k)}^T U_k\right]$$

$$= tr\left\{U_k^T \left[\sum_{s=1}^{c} w^s N_s (\overline{Z}^s - \overline{Z})_{(k)}(\overline{Z}^s - \overline{Z})_{(k)}^T\right] U_k\right\}$$

where $\overline{Z}$ is the centroid of all $Z_i$'s.

In this way, a within-class scatter and a between-class scatter may be generated where:

$$\alpha = tr(U_k^T S_w^{(k)} U_k), \text{ and } \beta = tr(U_k^T S_b^{(k)} U_k), \quad (7)$$

where the formula $$S_w^{(k)} = \sum_{i=1}^{N} w_i (Z_i - \overline{Z}^{s_i})_{(k)}(Z_i - \overline{Z}^{s_i})_{(k)}^T$$

provides the mode-k within-class scatter matrix and $$S_b^{(k)} = \sum_{s=1}^{c} w^s N_s (\overline{Z}^s - \overline{Z})_{(k)}(\overline{Z}^s - \overline{Z})_{(k)}^T$$

is the mode-k between class scatter matrix.

Then, $U_k$ may be solved successively in the following equation, $$\arg\max_{U_k} \frac{\beta}{\alpha} = \frac{tr(U_k^T S_b^{(k)} U_k)}{tr(U_k^T S_w^{(k)} U_k)} \quad (8)$$

by fixing the rest $U_i$'s to prepare $S_b^{(k)}$ and $S_w^{(k)}$, and repeating this procedure until convergence.

In some embodiments, weights $w_i$ and $w^s$ may be generated in the following forms:

$$\begin{cases} w_i = \exp\left(-\dfrac{d^2(X_i, \Omega_{s_i})}{t}\right), & i = 1, 2, \ldots, N, \\ w^s = \exp\left(-\dfrac{d^2(\Omega_s, \Omega)}{t}\right), & s = 1, 2, \ldots, c, \end{cases} \quad (9)$$

where $d(\cdot,\cdot)$ is some distance, t is the time variable, and $\Omega_s = \{X_i | s_i = s\}$ and $\Omega = \{X_i | i = 1, 2, \ldots, N\}$ are the sets of an $s^{th}$ class and all samples, respectively.

In this way, weights may be defined based on the structure of data, rather than on a Euclidean distance between data samples. In one embodiment, a contextual distance may be used and the weights calculated based on this contextual distance. Contextual distance may be defined on a contextual set X of nearest neighbors of a sample x. In this way, contextual distance is related to the contribution of the samples to a structural integrity of the contextual set, which may be depicted by a structural descriptor f, which may be scalar or vector valued, as examples. As a descriptor f(X) is an intrinsic structural characterization of the set X, if x complies with the structure of X, then removing x from X will have limited effect on overall structure. In contrast, if x is an outlier or a noise sample, then removing x from X will likely change the structure significantly. In this way, the contribution of x to the structure of X may be measured by $$\delta f = f(X) - f(X \setminus \{x\}) \quad (10)$$

Therefore, a distance from x to X may be defined as:

$$d(x, X) = \|\delta f\| = \|f(X) - f(X \setminus \{x\})\|. \quad (11)$$

Therefore, the weights in equation (9) may be defined according to:

$$d(X_i, \Omega_{s_i}) = \|f(\Omega_{s_i}) - f(\Omega_{s_i} \setminus \{X_i\})\|,$$

$$d(\Omega_s, \Omega) = \|f(\Omega) - f(\Omega \setminus \Omega_s)\|, \quad (12)$$

However, to utilize contextual distance based weights, an appropriate structural descriptor may be used. Therefore, a centroid descriptor may be defined as $$f(\Omega) = \frac{1}{|\Omega|} \sum_{x \in \Omega} x,$$

where $|\Omega|$ is the cardinality of $\Omega$. Therefore, a coding length descriptor may be $f(\Omega) = L(\Omega)$, where $L(\Omega)$ is the minimal number of bits to encode data in $\Omega$, up to a tolerable distortion $\epsilon$, where:

$$L(\Omega) = \frac{N+m}{2} \log_2 \det\left(I + \frac{m}{\epsilon^2 N} \tilde{X} \tilde{X}^T\right) + \frac{m}{2} \log_2\left(1 + \frac{\bar{x}^T \bar{x}}{\epsilon^2}\right) \quad (13)$$

where $X = [x_1, x_2, \ldots, x_N]$ is the data matrix of samples in $\Omega$ with each sample represented by an m-dimensional vector, $\bar{x}$ is the mean of the samples, and $\tilde{X} = X - \bar{x} e^T$, $e = (1, 1, \ldots, 1)^T$.

Unfortunately, these two descriptors are not particularly suitable for a TLLD approach due to the centroid descriptor inherently assuming a Euclidean sample space while a current formulation of coding length is vector-based. Therefore, to match the tensor nature of TLLD, a tensor coding length may be generated.

To generate a tensor coding length, each tensor is developed to a vector and then a mode-k coding length is computed for the set of these vectors:

$$L_{(k)}(X) = L(\{(X_1)_{(k)}, (X_2)_{(k)}, \ldots, (X_N)_{(k)}\}) \quad (14)$$

where $X = \{X_1, X_2, \ldots, X_N\}$ and $(X_i)_{(k)}$ is the mode-k unfolding of $X_i$. Then, a tensor coding length of X may be defined as the following vector:

$$L(X) = [L_{(1)}(X), L_{(2)}(X), \ldots, L_{(n)}(X)]^T. \quad (15)$$

An example of a tensor coding length may be computed by using the following empirically chosen tolerable distortion in equation (13):

$$\epsilon = \sqrt{\frac{10\left(\sum_{k=1}^{n} m_k\right)^2}{N^3 \prod_{k=1}^{n} m_k}}$$

Now the parameter t in equation (9) may be determined. In an LLD approach, this parameter may be difficult to tune as its value may vary significantly for different applications. However, in a TLLD approach as described herein, t can be rescaled as: $t = t' \sigma_w$ for $w_i$ and $t = t' \sigma_b$ for $w^s$, respectively, where $$\sigma_w = \frac{1}{N} \sum_{i=1}^{N} d^2(X_i, \Omega_{s_i}) \text{ and } \sigma_b = \frac{1}{N} \sum_{s=1}^{c} N_s d^2(\Omega_s, \Omega),$$

and wherein an example t' may be around 1. This treatment easily simplifies the parameter tuning for t. An embodiment of a TLLD method will next be described with reference to FIG. 2.

Figure 2:
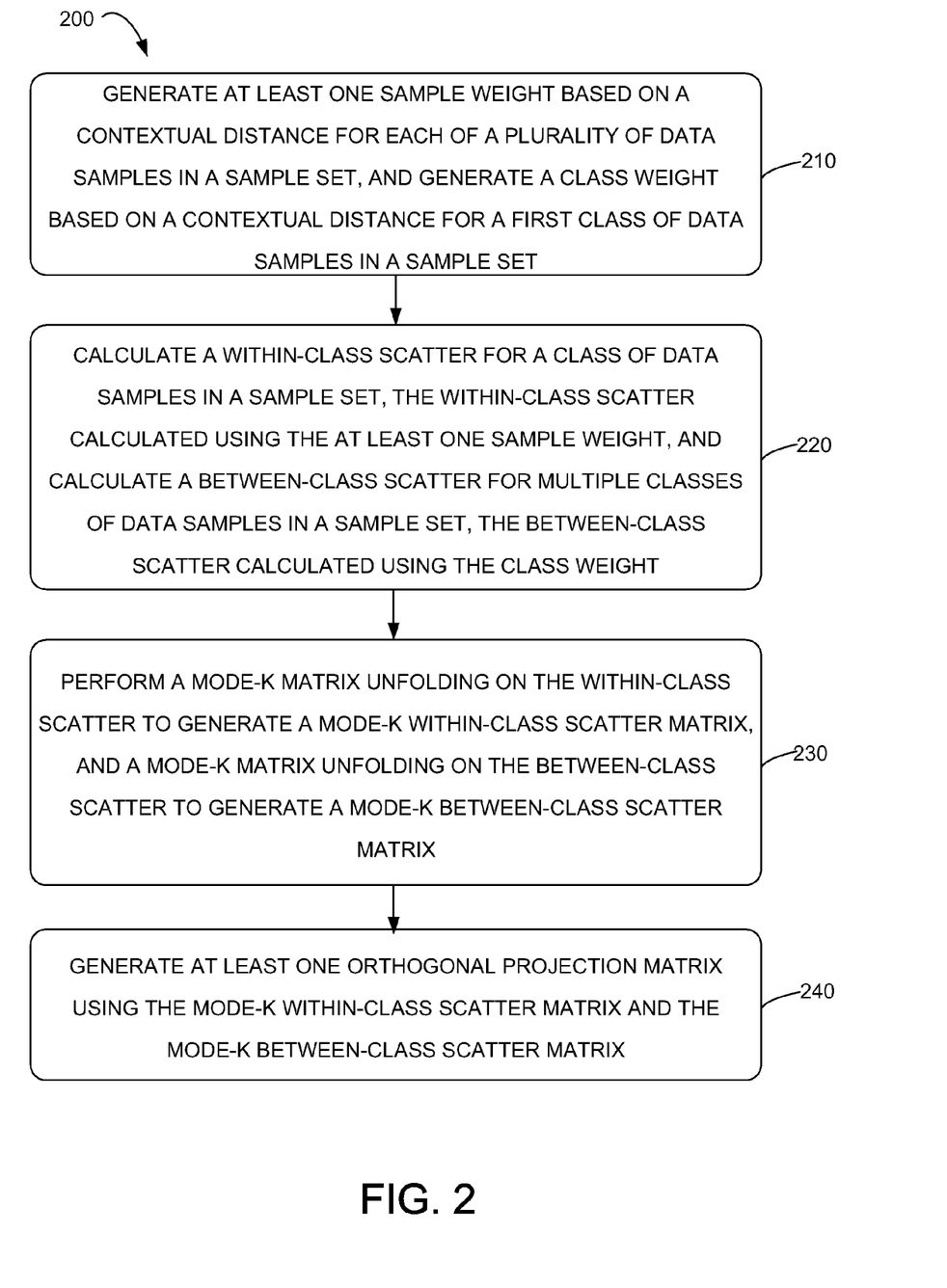
FIG. 2 shows a process flow depicting an embodiment of a method for tensor based feature extraction for pattern recognition and classification.

FIG. 2 shows a process flow depicting one embodiment of a method 200 for tensor based feature extraction. First, as indicated in block 210, method 200 comprises generating at least one sample weight based on a contextual distance for each of a plurality of data samples in a sample set and generating a class weight based on a contextual distance for a first class of data samples in a sample set.

Method 200 also comprises calculating a within-class scatter for a class of data samples in a sample set, wherein the within-class scatter is calculated using the at least one sample weight from block 210, and calculating a between-class scatter for multiple classes of data samples using the class weight from block 210, as indicated in block 220.

Next, method 200 comprises performing a mode-k matrix unfolding on the within-class scatter to generate a mode-k within-class scatter matrix, and also performing a mode-k matrix unfolding on the between-class scatter to generate a mode-k between-class scatter matrix, as indicated in block 230.

Next, in block 240, method 200 comprises generating at least one orthogonal projection matrix using the mode-k within-class scatter matrix and the mode-k between-class scatter matrix. In some embodiments, method 200 further comprises generating a tensor coding length for each of the tensor based data samples.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, personal computers, servers, laptop computers, hand-held devices, cellular phones, microprocessor-based programmable consumer electronics and/or appliances, and other computer image processing devices.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method stored in memory and executed via a processor of a computing device for extracting discriminant features from tensor based data samples, the method comprising:
   receiving a sample set including a plurality of data samples;
   generating at least one sample weight based on a contextual distance for each of a plurality of data samples in the sample set;
   generating a class weight based on a contextual distance for a first class of data samples in the sample set;
   calculating a within-class scatter for a class of data samples in the sample set, the within-class scatter calculated using the at least one sample weight;
   calculating a between-class scatter for multiple classes of data samples in the sample set, the between-class scatter calculated using the class weight;
   performing a mode-k matrix unfolding on the within-class scatter to generate a mode-k within-class scatter matrix;
   performing a mode-k matrix unfolding on the between-class scatter to generate a mode-k between-class scatter matrix;
   generating at least one orthogonal projection matrix using the mode-k within-class scatter matrix and the mode-k between-class scatter matrix; and
   outputting the at least one orthogonal projection matrix.

2. The method of claim 1, wherein the contextual distance for each of a plurality of samples in the sample set is calculated according to a formula:

$$d(X_i, \Omega_{s_i}) = \|f(\Omega_{s_i}) - f(\Omega_{s_i} \backslash \{X_i\})\|.$$

3. The method of claim 2, wherein generating at least one sample weight based on a contextual distance for each of a plurality of samples in the sample set further comprises generating a sample weight $w_i$ using a formula:

$$w_i = \exp\left(-\frac{d^2(X_i, \Omega_{s_i})}{t}\right).$$

4. The method of claim 3, wherein calculating a within-class scatter for a class of tensor based data samples in the sample set and calculated using at least one sample weight $w_i$ further comprises calculating a within-class scatter $\alpha$ using a formula:

$$\alpha = \sum_{s=1}^{c} \sum_{X_i \in \text{Class } s} w_i \|Y_i - \overline{Y}^s\|^2.$$

5. The method of claim 1, wherein the contextual distance for a first class in the sample set is calculated according to a formula:

$$d(\Omega_s, \Omega) = \|f(\Omega) - f(\Omega \backslash \Omega_s)\|.$$

6. The method of claim 5, wherein generating a class weight based on a contextual distance for a first class in the sample set further comprises generating a class weight $w^s$ using a formula:

$$w^s = \exp\left(-\frac{d^2(\Omega_s, \Omega)}{t}\right).$$

7. The method of claim 6, wherein calculating a between-class scatter for a class of tensor based data samples in the sample set and calculated using a class weight $w^s$ further comprises calculating a between-class scatter $\beta$ using a formula:

$$\beta = \sum_{s=1}^{c} w^s N_s \|\overline{Y}^s - \overline{Y}\|^2.$$

8. The method of claim 1, further comprising generating a tensor coding length for each of the tensor based data samples.

9. A system for extracting discriminant features from tensor based data, the system with an input, a memory, and a processor in communication with the input and the memory, the system comprising:
   a weight generator module stored in the memory and executed via the processor, the weight generator module configured to receive a sample set including a plurality of data samples and generate at least one sample weight based on a contextual distance for each of the plurality of data samples, and further to generate a class weight based on a contextual distance for a first class of data samples;
   a scatter module stored in the memory, executed via the processor, and in communication with the weight generator module, the scatter module configured to receive the at least one sample weight and the class weight and calculate a within-class scatter for a class of data samples using the at least one sample weight, and to calculate a between-class scatter for multiple classes of data samples using the class weight;
   an unfolding module stored in memory, executed via the processor, and coupled with the weight generator module and the scatter module, the unfolding module configured to perform a mode-k matrix unfolding on the within-class scatter to generate a mode-k within-class scatter matrix and to perform a mode-k matrix unfolding on the between-class scatter to generate a mode-k between-class scatter matrix; and a projection matrix module stored in memory, executed via the processor, and coupled with the scatter module and the unfolding module, the projection matrix module configured to generate at least one orthogonal projection matrix using the mode-k within-class scatter matrix and the mode-k between-class scatter matrix and output the at least one orthogonal projection matrix.

10. The system of claim 9, wherein the contextual distance for each of a plurality of samples in the sample set is calculated according to a formula:

$$d(X_i, \Omega_{s_i}) = \|f(\Omega_{s_i}) - f(\Omega_{s_i} \setminus \{X_i\})\|.$$

11. The system of claim 10, wherein at least one sample weight is generated using a formula:

$$w_i = \exp\left(-\frac{d^2(X_i, \Omega_{s_i})}{t}\right).$$

12. The system of claim 11, wherein a within-class scatter α is calculated using a formula:

$$\alpha = \sum_{s=1}^{c} \sum_{X_i \in Class\ s} w_i \|Y_i - \bar{Y}^s\|^2.$$

13. The system of claim 9, wherein the contextual distance for a first class in the sample set is calculated according to a formula:

$$d(\Omega_s, \Omega) = \|f(\Omega) - f(\Omega \setminus \Omega_s)\|.$$

14. The system of claim 13, wherein a class weight $w^s$ is generated using a formula:

$$w^s = \exp\left(-\frac{d^2(\Omega_s, \Omega)}{T}\right).$$

15. The system of claim 14, wherein a between-class scatter β is calculated using a formula:

$$\beta = \sum_{s=1}^{c} w^s N_s \|\bar{Y}^s - \bar{Y}\|^2.$$

16. The system of claim 9, wherein at least one orthogonal projection matrix is generated according to a formula:

$$\operatorname*{argmax}_{U_k} \frac{\beta}{\alpha} = \frac{tr(U_k^t S_b^{(k)} U_k)}{tr(U_k^T S_w^{(k)} U_k)}.$$

17. A computer-readable storage device storing instructions executable by a computing device to enable discriminant feature extraction using tensor based data, the instructions being executable to perform a method comprising:
   receiving a sample set including a plurality of data samples;
   generating at least one sample weight based on a contextual distance for each of a plurality of data samples in the sample set;
   generating a class weight based on a contextual distance for a first class of data samples in the sample set;
   calculating a within-class scatter for a class of data samples in the sample set, the within-class scatter calculated using the at least one sample weight;
   calculating a between-class scatter for multiple classes of data samples in the sample set, the between-class scatter calculated using the class weight;
   performing a mode-k matrix unfolding on the within-class scatter to generate a mode-k within-class scatter matrix;
   performing a mode-k matrix unfolding on the between-class scatter to generate a mode-k between-class scatter matrix; and
   generating at least one orthogonal projection matrix using the mode-k within-class scatter matrix and the mode-k between-class scatter matrix, wherein a contribution from the mode-k between-class scatter matrix is given more weight than a contribution from the mode-k within-class scatter matrix; and
   outputting the at least one orthogonal projection matrix.

18. The computer-readable storage device of claim 17, wherein the within-class scatter is calculated using a formula:

$$\alpha = tr(U_k^T S_w^{(k)} U_k).$$

19. The computer-readable storage device of claim 18, wherein the between-class scatter is calculated using a formula:

$$\beta = tr(U_k^T S_b^{(k)} U_k).$$

20. The computer-readable storage device of claim 19, wherein the at least one orthogonal projection matrix is generated according to a formula:

$$\operatorname*{argmax}_{U_k} \frac{\beta}{\alpha} = \frac{tr(U_k^T S_b^{(k)} U_k)}{tr(U_k^T S_w^{(k)} U_k)}.$$

* * * * *

UNITED STATES PATENT AND TRADEMARK OFFICE
CERTIFICATE OF CORRECTION

PATENT NO. : 8,024,152 B2
APPLICATION NO. : 12/235927
DATED : September 20, 2011
INVENTOR(S) : Wei Zhang et al.

Page 1 of 1

It is certified that error appears in the above-identified patent and that said Letters Patent is hereby corrected as shown below:

In column 3, line 5, after " $(i_1-1)m_2m_3 \ldots m_{k-1} + (i_2-1)m_3m_4 \ldots m_{k-1} + i_{k-1}$ " insert -- . --.

In column 6, line 19, after " $c = \sqrt{\dfrac{10(\sum_{k=1}^{n} m_k)^2}{N^3 \prod_{k=1}^{n} m_k}}$ " insert -- . --.

In column 9, line 21, in Claim 11, after "weight" insert -- $w_i$ --.

In column 10, line 5, in Claim 16, delete " $\operatorname*{argmax}_{U_k} \dfrac{\beta}{\alpha} = \dfrac{tr(U_k^T S_b^{(k)} U_k)}{tr(U_k^T S_w^{(k)} U_k)}$ "

and insert -- $\operatorname*{arg\,max}_{U_k} \dfrac{\beta}{\alpha} = \dfrac{tr(U_k^T S_b^{(k)} U_k)}{tr(U_k^T S_w^{(k)} U_k)}$ .--, therefor.

Signed and Sealed this
Fifteenth Day of November, 2011

David J. Kappos
*Director of the United States Patent and Trademark Office*